United States Patent [19]

Michel

[11] Patent Number: 4,778,273

[45] Date of Patent: Oct. 18, 1988

[54] PHOTOELECTRIC MEASURING SYSTEM

[75] Inventor: Dieter Michel, Traunstein, Fed. Rep. of Germany

[73] Assignee: Dr. Johannes Heidenhain GmbH, Traunreut, Fed. Rep. of Germany

[21] Appl. No.: 110,566

[22] Filed: Oct. 19, 1987

Related U.S. Application Data

[63] Continuation of Ser. No. 716,397, Mar. 27, 1985, abandoned.

[30] Foreign Application Priority Data

May 9, 1984 [DE] Fed. Rep. of Germany ....... 3417176

[51] Int. Cl.$^4$ .......................... G01B 11/02; G01B 7/02
[52] U.S. Cl. ................................... 356/374; 33/125 C; 250/237 G
[58] Field of Search ..................... 356/374; 250/237 G; 33/125 C

[56] References Cited

U.S. PATENT DOCUMENTS

| | | | |
|---|---|---|---|
| 3,816,003 | 6/1974 | Litke | 33/125 C |
| 4,176,276 | 11/1979 | Kaul et al. | 356/356 |
| 4,340,305 | 7/1982 | Smith et al. | 356/356 |
| 4,477,189 | 10/1984 | Ernst | 356/374 |

FOREIGN PATENT DOCUMENTS 1814785 12/1968 Fed. Rep. of Germany.
2316248 3/1973 Fed. Rep. of Germany.

OTHER PUBLICATIONS

Dreigitterschrittgeber, Dissertation by Dipl-Ing. Jorg. Willhelm, given Jun. 23, 1941, (1978), pp. 12-26.

Primary Examiner—R. A. Rosenberger
Attorney, Agent, or Firm—Willian Brinks Olds Hofer Gilson & Lione Ltd.

[57] ABSTRACT

In a photoelectric measuring arrangement two grids operating as a scale and a scanning plate are built up of several component phase grids which define periodic graduations having differing grid constants. The periodic signals of differing periodicity arising through diffraction are optically or electrically summed.

16 Claims, 5 Drawing Sheets

PHOTOELECTRIC MEASURING SYSTEM

This application is a continuation of application Ser. No. 06/716,397, filed Mar. 27, 1985.

BACKGROUND OF THE INVENTION

The present invention relates to photoelectric measuring systems of the type comprising a graduation carrier which defines a measuring graduation, a scanning plate mounted to move along the graduation, an illuminating arrangement mounted to illuminate the scanning plate, at least one photosensor mounted to detect light from the illuminating arrangement modulated by the graduation and the scanning plate, and an evaluating unit coupled to the photosensor.

Such systems are often used as incremental length or angle measuring systems, and they often include devices for photoelectrically generating electrical signals that can be used for example to define a zero point for the measuring system in a reproducible manner.

West German DE-OS No. 18 14 785 describes the construction of a reference mark for the generation of a reference pulse.

Using this approach however a sufficiently exact reference pulse can be derived from such a reference mark only if the scanning distance is maintained at a very small magnitude. For this reason, using this approach the scanning distance must be held to close tolerances with respect to undesired distance fluctuations.

In the prior art photoelectric scanning of known reference marks there are typically obtained one-beat signals (Eintaktsignale). In order to obtain the push-pull or psuedo-push-pull signals required for sure evaluation, two reference marks or a reference mark and a field (such as for example a mirror) must be provided and scanned to generate a reference signal. In the event two reference marks or a reference mark and a field are used, uneven dirtying of the reference marks or relative spacing differentials between the reference marks in the scanning may cause the generated photoelectric signal to change in such a way that a sure evaluation of the reference mark is no longer possible.

The theory and the interrelations between the various components of such path measuring systems are thoroughly explained in the dissertation published in 1978 by J. Willhelm entitled "Dreigitterschritgeberphotoelektrische Aufnehmer zur Messung von Lageänderungen" (TU Hannover).

In addition, West German DE-OS No. 23 16 248 describes a photoelectric pulse generator that operates with phase grids, which allow a greater scanning distance between the two grids which are shiftable with respect to one another. For this reason, the sensitivity to spacing changes is less critical than in the reference marks described initially above. However, this document provides no suggestion as to how a reference mark can be scanned and evaluated with sufficient certainty.

SUMMARY OF THE INVENTION

This invention is directed to an improved device for photoelectrically generating an electrical signal in a measuring system of the type described initially above, in which the permissible tolerances for fluctuations of the scanning distance can be increased, in which a relatively large scanning distance is possible, and which is well suited for the generation of reference pulses in conjunction with reference marks.

According to this invention, a measuring system of the type described initially above is provided with at least one additional graduation comprising a plurality of periodic grids, each of which defines a different grid constant. Means are provided for deriving a plurality of periodic signals from the periodic grids, and means are provided for combining the plurality of periodic signals.

The present invention provides the important advantage that relatively large scanning distances may be used in the scanning of reference marks, and that such relatively large scanning distances are correspondingly relatively insensitive to scanning distance change. Furthermore, this invention makes possible individual reference marks which may be used to generate reference signals of any desired signal form. Further advantageous features of the invention are set forth in the dependent claims.

The invention itself, together with further objects and attendant advantages, will best be understood by reference to the following detailed description, taken in conjunction with the accompanying drawings. These drawings have been simplified to a schematic form in order to make them more comprehensible.

DETAILED DESCRIPTION OF THE DRAWINGS

DETAILED DESCRIPTION OF THE PRESENTLY PREFERRED EMBODIMENTS

As used in the following specification and claims the term "light" is intended in its broad sense to encompass ultraviolet and infrared radiation, as well as radiation lying in the visible range.

Figure 1:
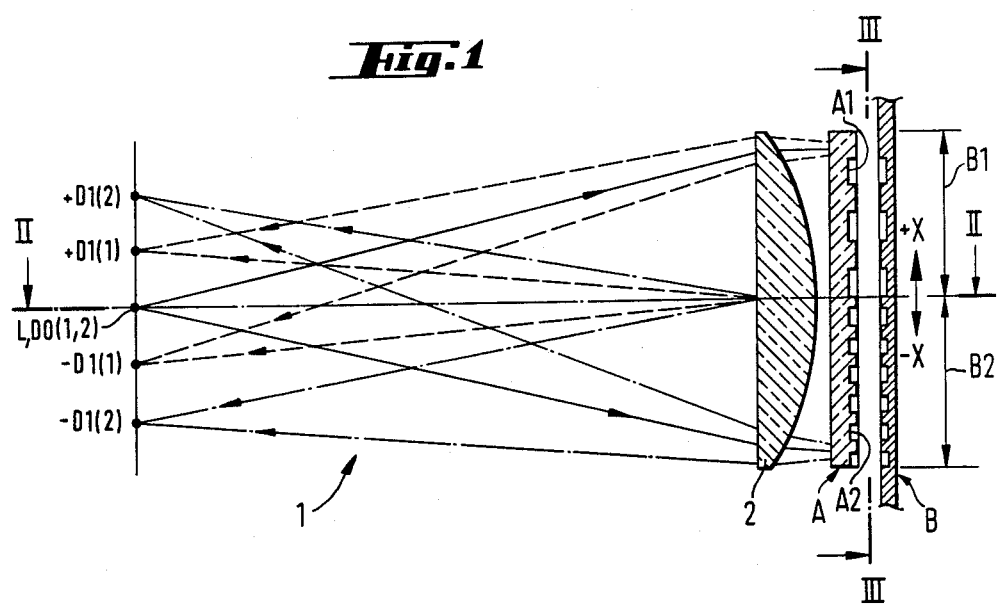
FIG. 1 shows a schematic representation of a measuring arrangement operating according to the direct-light process.

Turning now to the drawings, FIG. 1 shows a length measuring system 1 made in accordance with the so-called three-grid direct light principle. Radiation from a light source L is collimated by a condenser 2 and diffracted and reflected by phase grids A, B. The phase grids A and B have separate fields A1, A2, B1, B2, each of which defines a respective periodic graduation. The grid constants of the fields A1 and B1 are identical; the grid constants of the fields A2, B2 are identical; and the grid constants of the fields A1 and A2 differ from one another.

In the focal plane of the condenser 2 diffraction images of zero and higher order of the light source L are generated. These diffraction images correspond to the differing grid constants and to the grid formation (for example the ratio of the furrow width to the grid constant, the furrow depth, and similar parameters). At discrete places in the focal plane of the condenser 2 (in correspondence to grating theory) a plurality of photo-detectors D0 to ±D1(2) are arranged.

Figure 2:
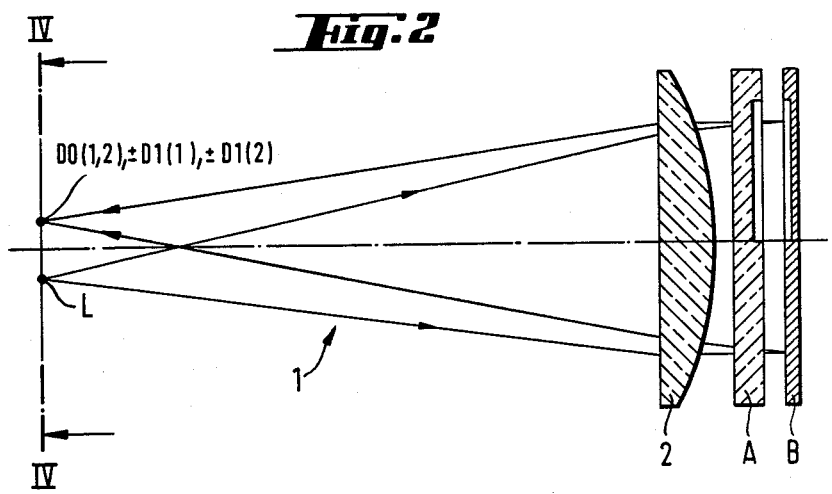
FIG. 2 shows a plan view of the measuring arrangement of FIG. 1 taken along section line II—II of FIG. 1.

Each phase grid A and B, therefore, defines two fields A1, A2 and B1, B2, which present differing grid constants. FIG. 2 shows the length measuring system 1 of FIG. 1 in plan view, taken along line II—II of FIG. 1. As shown in FIG. 2, the light source L is arranged offset with respect to the optical axis, so that the diffraction images of zero order are not reflected into the light source L, but are rather displaced by the same amount as the light source L with respect to the optical axis. These zero order diffraction images fall on the correspondingly positioned photo-detectors D0. The light source L can alternately remain aligned with the optical axis if only orders higher than the zero order are to be evaluated.

Figure 3:
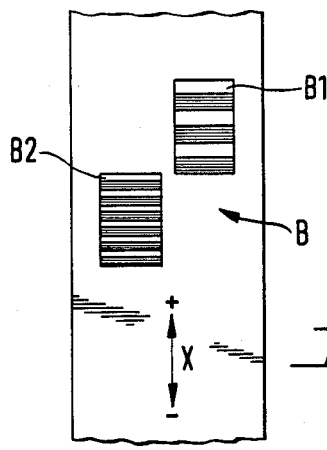
FIG. 3 shows a view of a reflex phase grid taken along line III—III of FIG. 1.

FIG. 3 shows a first embodiment of the reflex phase grid B, which shows in reduced scale the phase grid fields B1 and B2 along the line III—III of FIG. 1. As shown in FIG. 3, the phase grid fields B1, B2 have differing grid constants. Theoretically, there is also possible an arrangement of the graduation fields B1 and B2 differing from that shown in FIG. 3.

Figure 4:
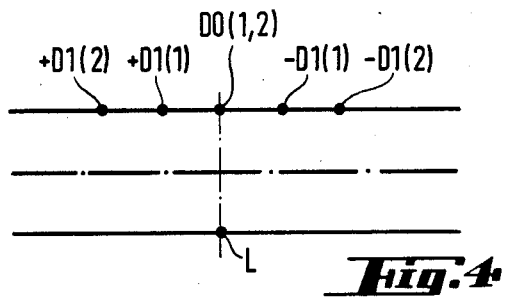
FIG. 4 shows a view of the focal plane of the measuring arrangement of FIGS. 1 and 2, taken along line IV—IV of FIG. 2.

FIG. 4 is a schematic representation of the position of the photo-detectors +D1(2)——D1(2), taken along line IV—IV of FIG. 2.

Figure 5:
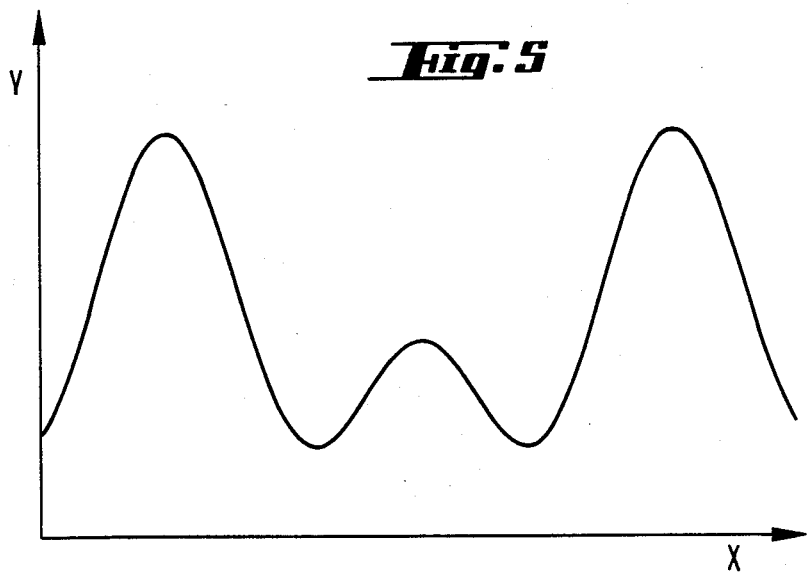
FIG. 5 shows a typical signal waveform generated with the phase grids shown in FIG. 1.

FIG. 5 shows a typical signal course generated by the measuring arrangement shown in FIGS. 1-4. This signal is generated as the phase grid B is displaced in the X-direction, thereby modulating the light source images. This signal can be picked up on photodetector D0 (FIGS. 1, 2 and 4).

Figure 6:
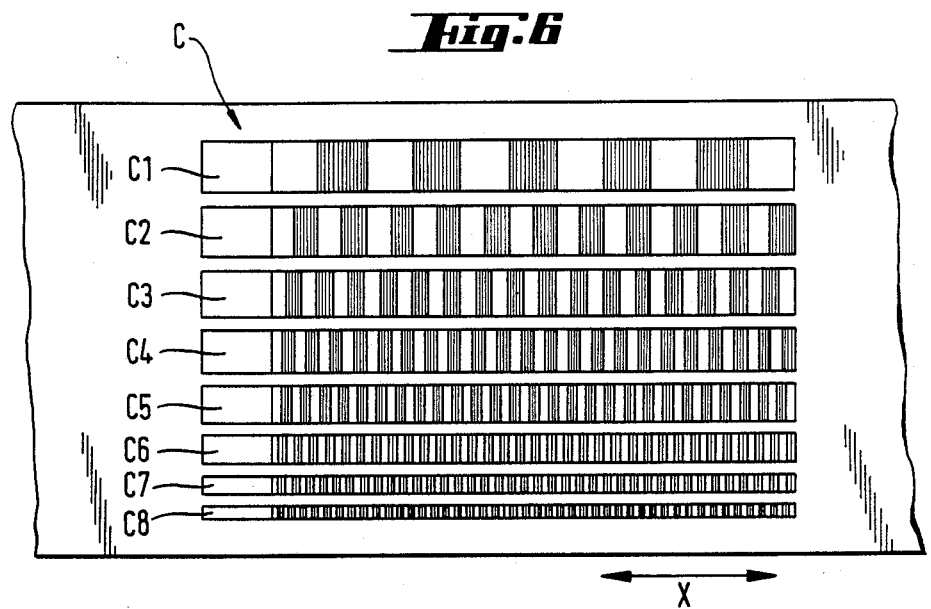
FIG. 6 shows an alternate arrangement for the phase grids.

FIG. 6 illustrates the structure of a phase grid C which includes a total of eight fields C1-C8 instead of the two fields described above. The grid constants of the eight fields C1-C8 are formed in the ratio 1:2:3:4:5:6:7:8. The fields C1-C8 are formed in correspondence to a selected Fourier series, and the surface areas of the fields C1-C8 are proportional to constants that correspond to the Fourier coefficients of this selected Fourier series.

Figure 7:
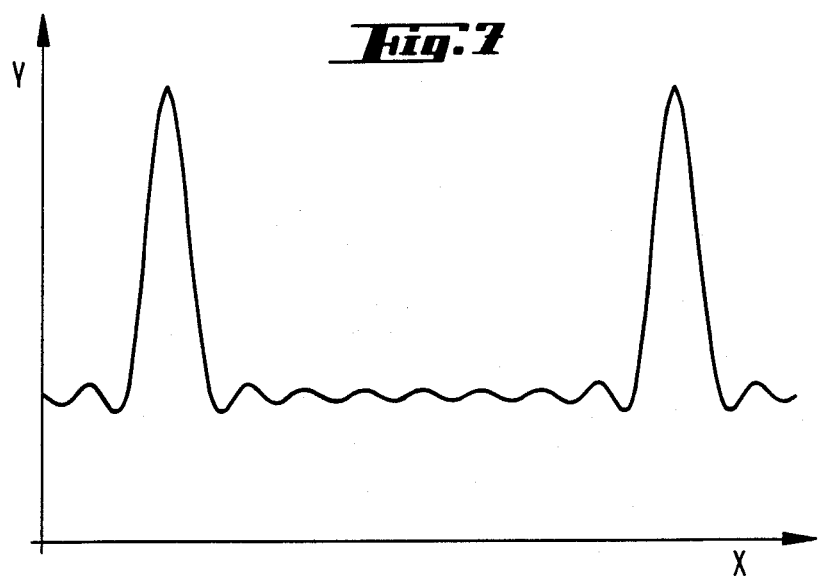
FIG. 7 shows a typical signal waveform obtained with the phase grids of FIG. 6.

When the phase grid C of FIG. 6 is moved in the measuring direction in a measuring instrument such as that shown in FIG. 1, the photo-detector D0 for the zero order diffraction signal generates a signal course as shown in FIG. 7.

A counterphase signal to the signal of FIG. 7 (push-pull) is obtained by evaluating the ± 1st order diffraction signals under the assumption that the ratio of the furrow-width to the grid constant of the respective graduations is 1:2.

Figure 8:
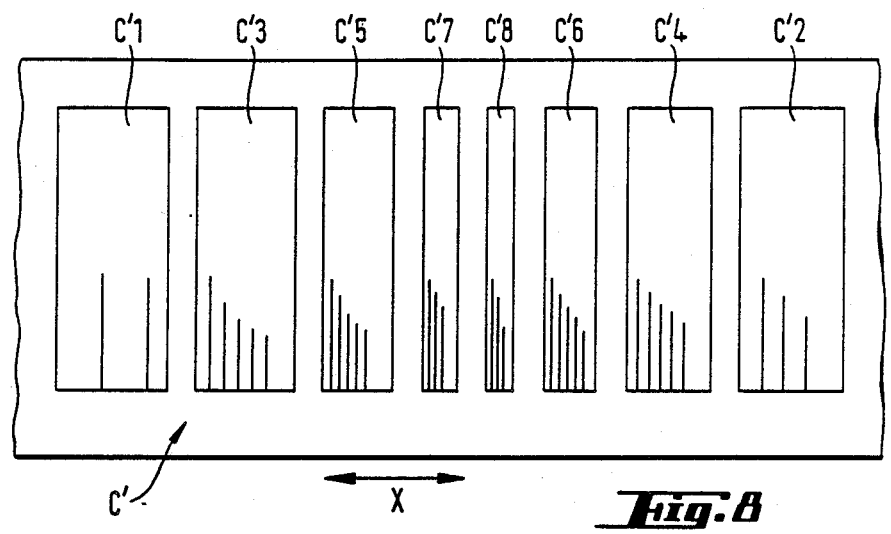
FIG. 8 shows a third, particularly advantageous arrangement of the phase grids.

The fields C1-C8 of FIG. 7 are aligned parallel to one another along the measuring direction X. A variant of the phase grid C is shown in FIG. 8, in which the representation of the respective fields C' is further simplified. In FIG. 8 the fields C'1-C'8 are arranged in succession along the measuring direction in a sequence shown in FIG. 8. Such a formation of the phase grid C' makes the phase grid C' more insensitive to errors caused by twisting about the optical axis.

The surface areas of the respective fields C'1-C'8 are maintained in proportion to the above mentioned coefficients of the desired Fourier series.

Figure 9:
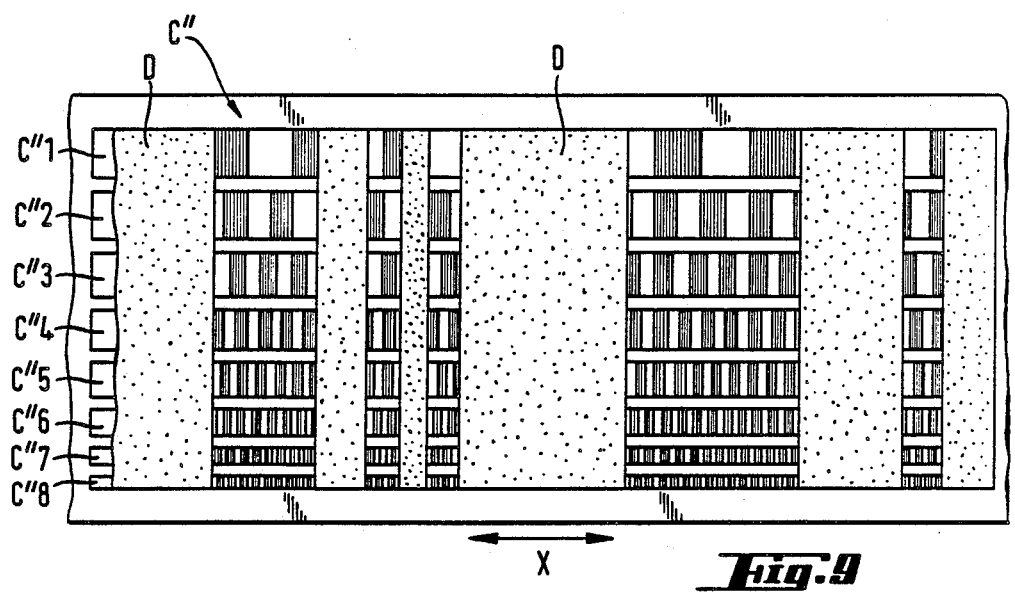
FIG. 9 shows a further variant of a phase grid arrangement for additional signal modulation.

FIG. 9 shows a phase grid C" which includes grids C"1-C"8 similar to the fields C1-C8 of FIG. 6. However, the phase grids C" in addition include a further graduation D active in the measuring direction X, which additionally modulates the signal course shown in FIG. 7. As shown in FIG. 9, the graduation field D is nonperiodic. Thus, as shown in FIG. 9, only partial zones of the phase grid fields C"1-C"8 are active. The additional graduation D can be arranged spatially offset in the direction of the optical axis and, for example, may be shiftable in the measuring direction X with respect to the phase grid C". By this measure a particular location along the measuring direction X can be selected at which the additional graduation D becomes active. The arrangement of fields on the phase grids A, B, C, C', C" which are shiftable with respect to one another can correspond to one another, but such exact correspondence is not necessary in all cases.

Figure 10:
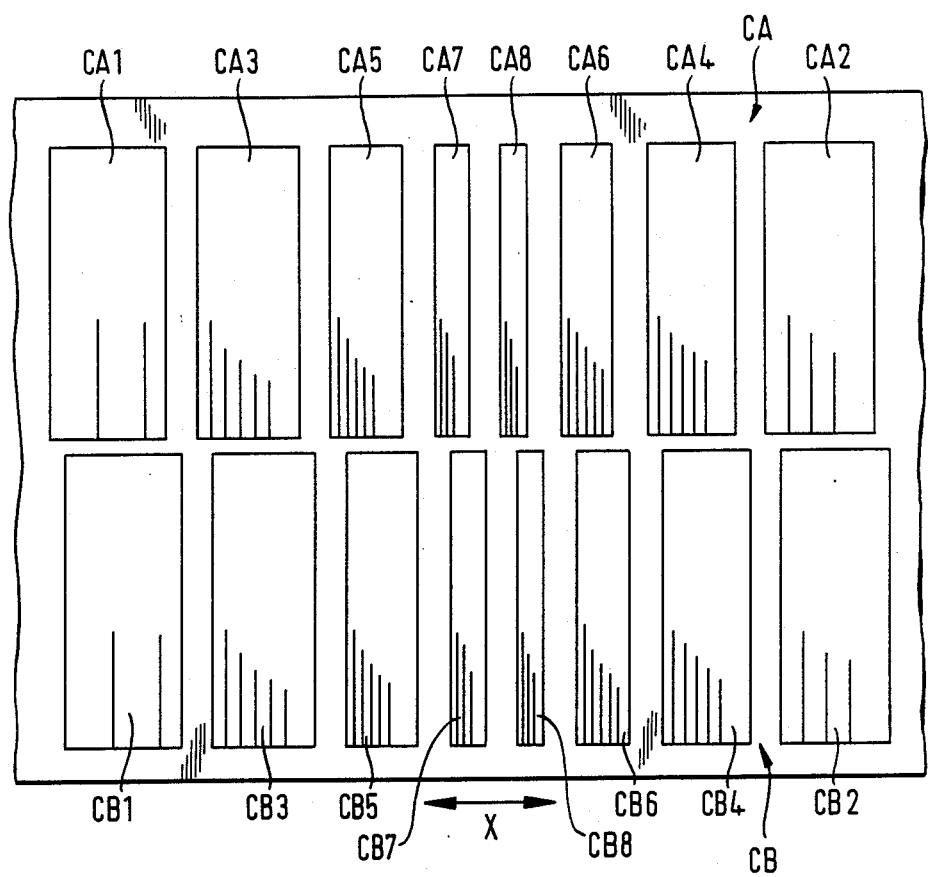
FIG. 10 shows an additional arrangement of phase grids of the general type shown in FIG. 8 showing additional phase-displaced phase grids.

Thus, for example, further length or angle graduation fields CA, CB can be provided in which, as shown in FIG. 10 for two such fields, the fields CA1-CB8 of equal grid constant in the measuring direction are displaced in phase with respect to one another by a fraction or a multiple of the associated grid constant.

Further, it lies within the scope of this invention to provide instead of the photo-detectors light sources with possibly differing wavelengths and to exchange the light source for a photo-detector or to combine these elements in any suitable manner. It is thus possible in a simple manner to influence the signal course by variable control of the light sources.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. In a device for photoelectrically generating electrical signals in a measuring system of the type comprising a graduation carrier, a scanning plate mounted to move relative to the graduation carrier at a defined scanning distance from the graduation carrier, an illuminating arrangement, at least one photosensor, and an evaluating unit coupled to the photosensor, the improvement comprising:
   at least one graduation comprising a plurality of periodic grids;
   means for deriving a plurality of periodic signals from the periodic grids; and
   means for combining the plurality of periodic signals to generate a resultant signal;
   each of the grids defining a selected grid characteristic so that the resultant signal is generated with a predetermined waveform to reduce sensitivity to fluctuations in scanning distance.

2. The invention of claim 1 further comprising a nonperiodic graduation field associated with the periodic grids to define a reference mark.

3. The invention of claim 2 wherein the graduation defines a measuring direction and wherein the non-periodic graduation field is shiftable in the measuring direction.

4. The invention of claim 3 wherein the graduation is constructed as a phase grid.

5. The invention of claim 1 wherein the graduation is constructed as a phase grid.

6. The invention of claim 5 wherein the phase grid comprises a laminar grid.

7. The invention of claim 5 wherein the phase grid comprises an echelette grid.

8. The invention of claim 1 wherein the graduation comprises first and second additional graduations, each defining a respective plurality of periodic grids, corresponding periodic grids of the first and second additional graduations having identical grid constants, individual periodic grids of a single additional graduation having differing grid constants;

corresponding periodic grids in the first and second additional graduations being spaced from one another in a measuring direction defined by the measuring graduation by a fraction of multiple of the respective grid constant.

9. The invention of claim 1 wherein the illuminating arrangement and the photodetector are interchangeable with one another.

10. The invention of claim 1 wherein the illuminating arrangement comprises a plurality of light sources, each having a different wavelength distribution.

11. The invention of claim 1 wherein the combining means operates to sum the plurality of periodic signals optically.

12. The invention of claim 1 wherein the combining means operates to sum the plurality of periodic signals electronically.

13. The invention of claim 1 wherein the grid characteristics are defined in correspondence to selected terms of a predefined mathematical series.

14. The invention of claim 13 wherein the mathematical series is a Fourier series.

15. The invention of claim 1 wherein the grid characteristic represents the grid constant.

16. In a device for photoelectrically generating signals in a measuring system of the type comprising a graduation carrier, scanning plate mounted to move relative to the graduation carrier, and an illuminating arrangement, the improvement comprising:

at least one graduation field located on at least one of (1) the graduation carrier and (2) the scanning plate, the graduation field comprising a plurality of grids with periodic graduation and defining a measuring direction;

the graduation field, scanning plate and illuminating arrangement operative to produce a plurality of modulated signals; and means for combining the modulated signals to produce a resultant signal containing information indicative of the position of the scanning plate in the measuring direction relative to the graduation carrier;

each grid constructed to define a selected grid constant in correspondence to a selected Fourier series to enhance the information contained in the resultant signal.

* * * * *